US005535191A

United States Patent [19]

Park

[11] Patent Number: 5,535,191

[45] Date of Patent: Jul. 9, 1996

[54] METHOD AND APPARATUS FOR SWITCHING BETWEEN REDUNDANT HARDWARE IN A WIRELESS DATA COMMUNICATION SYSTEM

[75] Inventor: Daniel J. Park, Beaverton, Oreg.

[73] Assignee: Seiko Communications Systems, Inc., Beaverton, Oreg.

[21] Appl. No.: 495,367

[22] Filed: Jun. 28, 1995

[51] Int. Cl.$^6$ .................................................. H04L 1/22
[52] U.S. Cl. ........................... 370/16; 455/8; 395/182.09; 340/825.01
[58] Field of Search ............................. 370/16, 13, 16.1, 370/94.1, 74, 92, 98, 110.1, 60, 94.3; 455/8, 9, 63, 67.3, 67.1, 50.1; 395/181, 182.01, 182.02, 182.08, 182.09; 340/825.01, 827, 825.06, 825.07

[56] References Cited

U.S. PATENT DOCUMENTS

| | | | |
|---|---|---|---|
| 4,713,808 | 12/1987 | Gaskill et al. | 370/94 |
| 4,875,038 | 10/1989 | Siwiak et al. | 340/825 |
| 4,882,579 | 11/1989 | Siwiak | 340/825 |
| 4,891,637 | 1/1990 | Siwiak et al. | 340/825 |
| 4,897,835 | 1/1990 | Gaskill et al. | 370/94.1 |
| 4,928,096 | 5/1990 | Leonardo et al. | 340/825 |
| 4,940,963 | 7/1990 | Gutman et al. | 340/313 |
| 4,951,044 | 8/1990 | Nelson et al. | 340/825 |
| 5,070,329 | 12/1991 | Jasinaki | 340/825 |
| 5,117,460 | 5/1992 | Berry et al. | 381/41 |
| 5,124,697 | 6/1992 | Moore | 340/825 |
| 5,142,279 | 8/1992 | Jasinski et al. | 340/825 |
| 5,142,692 | 8/1992 | Owen | 455/48 |
| 5,148,469 | 9/1992 | Price | 379/57 |
| 5,150,110 | 9/1992 | Breeden | 340/825 |
| 5,153,582 | 10/1992 | Davis | 340/825 |
| 5,155,479 | 10/1992 | Ragan | 340/825 |
| 5,159,331 | 10/1992 | Park et al. | 340/825 |
| 5,162,790 | 11/1992 | Jasinski | 340/825 |
| 5,166,932 | 11/1992 | Hoff et al. | 370/95.1 |
| 5,170,487 | 12/1992 | Peek | 455/45 |
| 5,185,604 | 2/1993 | Nepple et al. | 340/825.44 |
| 5,187,470 | 2/1993 | King et al. | 340/825.44 |
| 5,189,413 | 2/1993 | Gaskill et al. | 340/825.44 |
| 5,220,366 | 6/1993 | King | 354/76 |
| 5,260,700 | 11/1993 | Merchant et al. | 340/825.44 |
| 5,268,897 | 12/1993 | Komine et al. | 370/60 |
| 5,301,184 | 4/1994 | Vriu et al. | 370/16 |
| 5,311,516 | 5/1994 | Kuznicki et al. | 370/94.1 |
| 5,408,462 | 4/1995 | Opoczynski | 370/16 |
| 5,479,396 | 12/1995 | Kusano | 370/16 |

OTHER PUBLICATIONS

"High Speed Subcarrier Is Wave of Future" by Lyle Henry, Guest Commentary, *Radio World*, Jun. 1, 1994.

*Primary Examiner*—Douglas W. Olms
*Assistant Examiner*—Ajit Patel
*Attorney, Agent, or Firm*—Elmer Galbi

[57] ABSTRACT

A wireless communication system uses transmitted data signals to monitor and control redundant modulator hardware. A modulator unit signature identifying the modulator unit currently transmitting data is embedded into each data frame carried by the transmission signal. Each modulator unit can then independently monitor the transmission signal to determine which modulator is currently transmitting data. Each modulator unit then monitors the transmission signal in case the modulator unit actively generating the transmission signal fails. In a failure situation, the active modulator unit disconnects itself from the transmission circuity while the backup modulator unit independently connects to the transmission circuitry to begin active transmission.

19 Claims, 5 Drawing Sheets

METHOD AND APPARATUS FOR SWITCHING BETWEEN REDUNDANT HARDWARE IN A WIRELESS DATA COMMUNICATION SYSTEM

BACKGROUND OF THE INVENTION

This invention relates generally to controlling redundant hardware in communication systems and more particularly to using wireless data transmissions from a transmitter system to control switching between redundant modulator units.

Various issued patents and pending applications including U.S. Pat. Nos. 4,713,808 and 4,897,835 (both by Gaskill), U.S. Pat. No. 5,187,470 (King) and pending application Ser. No. 08/046,112, filed Apr. 09, 1993 show systems where digital data is transmitted on an FM subcarrier and modulated on an FM baseband. The data is transmitted to a pager receiver that filters the subcarrier from the rest of the FM baseband and then decodes the data on the subcarrier into digitally encoded messages.

To increase reliability, systems as discussed above often use redundant transmission equipment. For example, FIG. 1 is a prior art schematic diagram of a wireless paging system such as shown in U.S. Pat. No. 4,713,808 to Gaskill et al. that uses redundant modulator units.

Modulator units 18 and 24 each receive the same transmission data from a local clearinghouse facility 11. The modulator units each separately encode the transmission data into time division multiplexed data packets that are carried on a subcarrier signal. Each modulator unit 18 and 24 includes a relay (not shown) that selectively couples the modulator unit output to a frequency modulation (FM) exciter 28. The FM exciter 28 combines the subcarrier signal with an FM audio signal 35 onto an FM baseband.

The FM baseband output from FM exciter 28 is amplified by a power amplifier (PA) 30 and then broadcast from antenna 32 to a remote receiver. For example, the digital data output from system 12 is transmitted to wireless pager receivers.

Modulator unit 18 and 24 are connected to a receiver 26 that monitors the signal transmitted from antenna 32. An inter-unit communication bus 20 is used for relaying general control information from a central controller (not shown) to both modulator unit 18 and 24. Dedicated redundancy status lines 22 are coupled between modulator unit 18 and modulator unit 24 to communicate modulator unit operational status.

When modulator unit 18 is actively coupled to FM exciter 28, receiver 26 monitors the condition of the output from modulator unit 18 transmitted from antenna 32. If data is not being accurately transmitted, for example, modulator unit 18 has failed, modulator unit 18 sends a signal over lines 22 instructing modulator unit 24 to connect to FM exciter 28. In turn, modulator 18 disconnects from the FM exciter.

Since modulator unit 24 is generating the same data on the same subcarrier signal output by modulator unit 18, data communication to remote receivers is maintained by replacing the failed modulator unit 18 with backup modulator unit 24.

The problem with the redundant system shown in FIG. 1 is that dedicated redundancy control lines 22 are required to control operating status between modulator unit 18 and modulator unit 24. Control lines 22 are used to provide the modulator unit power state, relay state, relay control, and handshaking data between the two modulator units 18 and 24. Using dedicated redundancy status lines 22 increase the number of pins and overall hardware complexity of each modulator unit.

General purpose communication networks such as a local area network (LAN) are effective for carrying information between different transmission systems. However, LAN's frequently fail or delay message transmissions during heavy data traffic. As a result, a general communication network such as a LAN does not have sufficient reliability or operating performance for transmitting redundancy status information.

Accordingly, a need remains for communicating redundancy status information to redundant modulator units without increasing hardware complexity or reducing reliability in the transmitter hardware.

SUMMARY OF THE INVENTION

A wireless communication system uses transmitted data signals for monitoring and controlling redundant modulator hardware. A modulator unit signature is embedded into the data stream of the transmission signal. Each modulator unit then monitors the transmission signal to determine both the status and source of the current transmission signal.

Each modulator unit independently determines if the active modulator unit fails via the data transmission signal. In a failure situation, the active modulator unit disconnects itself from the transmission circuity while the backup modulator unit independently connects itself to the transmission circuitry to begin active transmission.

This wireless redundancy communication protocol increases reliability and improves response time by eliminating the temporary failures and communication bottlenecks that occur when communication is performed over a LAN network. The wireless redundancy communication protocol also eliminates the additional connectors and wires required for dedicated redundancy communications lines used in current modulator units.

In one embodiment, the modulator unit identification signature is carried in pad bits that are currently stuffed between data packets containing receiver messages. Thus, modulator unit identification is embedded in the data transmission signal without changing existing data formats.

The foregoing and other objects, features and advantages of the invention will become more readily apparent from the following detailed description of a preferred embodiment of the invention which proceeds with reference to the accompanying drawings.

DETAILED DESCRIPTION

Figure 2:
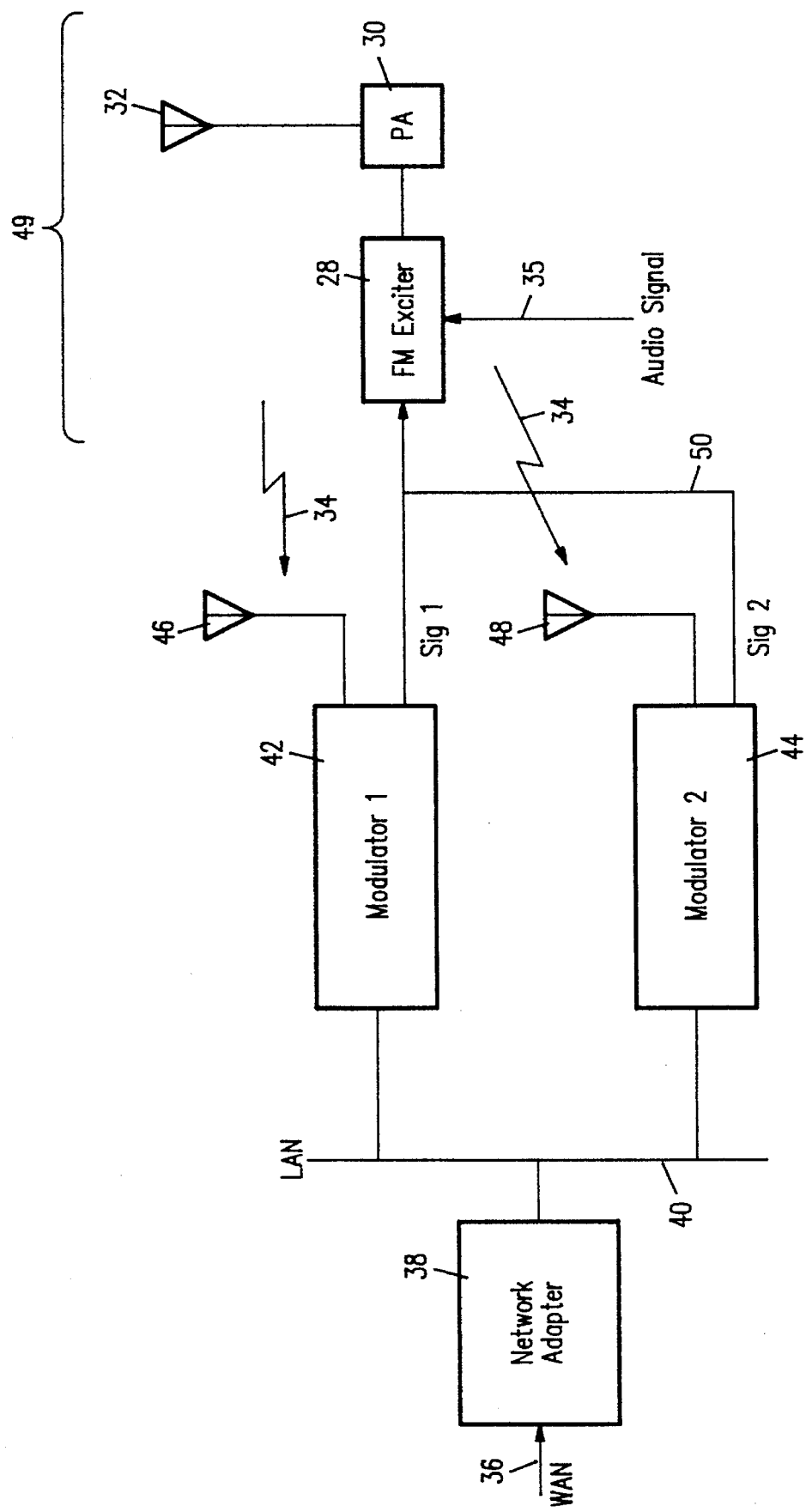
FIG. 2 is a diagram of a wireless redundancy status communication system according to the invention.

FIG. 2 is a diagram for a wireless transmission system 12 having redundant modulator units 42 and 44. A wide area network (WAN) 36 receives data from land lines, satellites, RF modems, etc. A network adapter 38 converts transmission data from the WAN 36 into a common data format sent over LAN 40. Network adapter 38 is known to those skilled in the art and is, therefore, not described in detail.

Modulator unit 42 and modulator unit 44 each receive transmission data over LAN 40 and are selectively coupled at an output to a transmitter circuit 49 that includes an FM exciter 28, power amplifier 30 and antenna 32. The FM exciter 28 combines the data output from the modulator unit with an FM audio signal from line 35 on the same FM baseband transmitted from antenna 32. FM transmitter circuits are well known to those skilled in the art and are, therefore, not described in detail.

Figure 1:
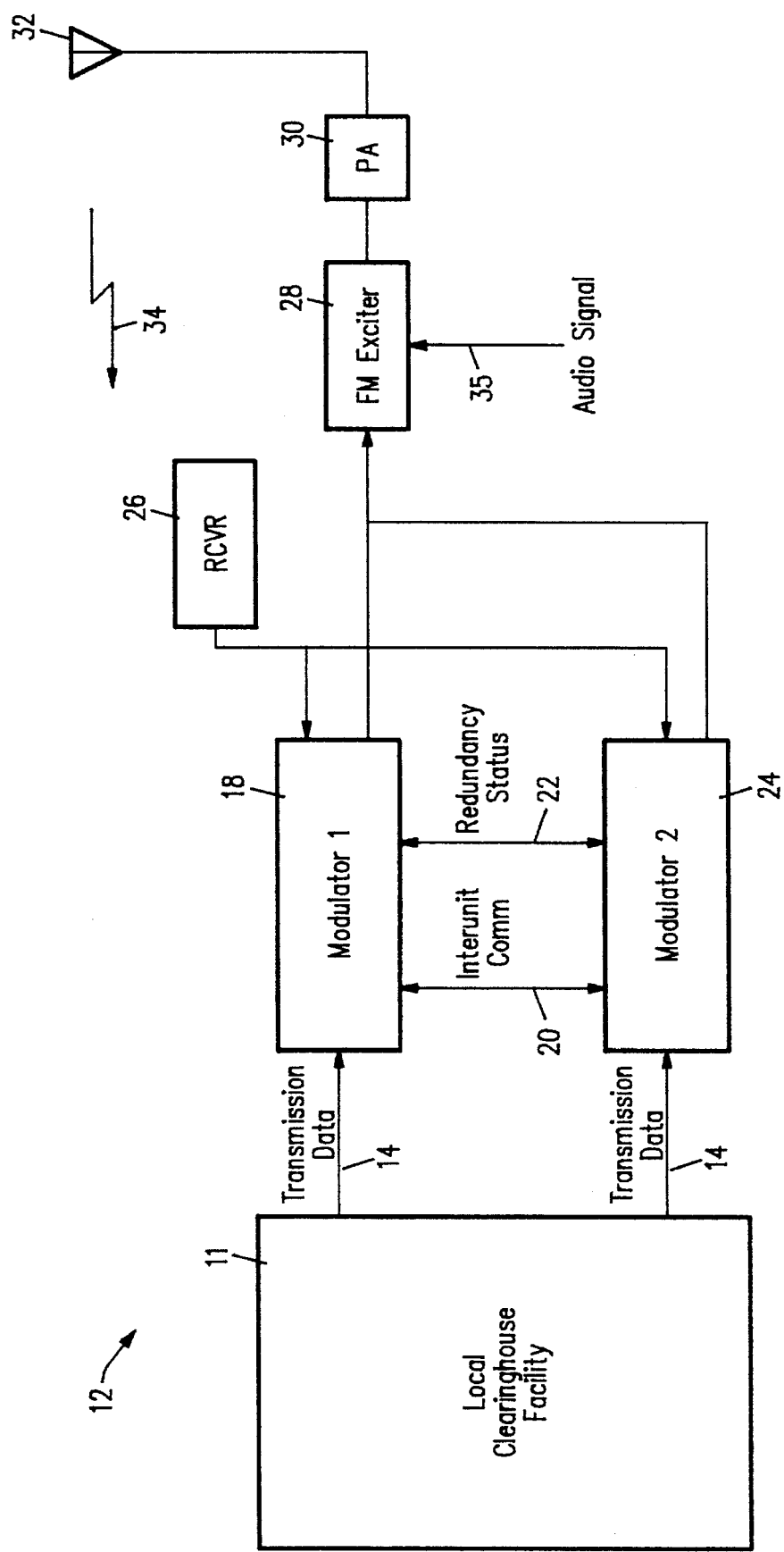
FIG. 1 is a diagram of a prior art wireless transmission system having redundant modulator units.

Modulator unit 42 includes an antenna 46 and modulator unit 44 includes an antenna 48 each independently receiving the signal transmitted from antenna 32. As further described below, a modulator unit identification signature is embedded in the digital data stream output from transmission circuit 49. Thus, each modulator unit can independently monitor the transmission signal while also identifying the source of the transmission signal. Since the status and source of transmission signal 34 is derived directly from the transmission signal, dedicated connectors and wires are not needed for relaying redundancy status data between the modulator units (i.e., redundancy status lines 22 in FIG. 1).

Figure 3:
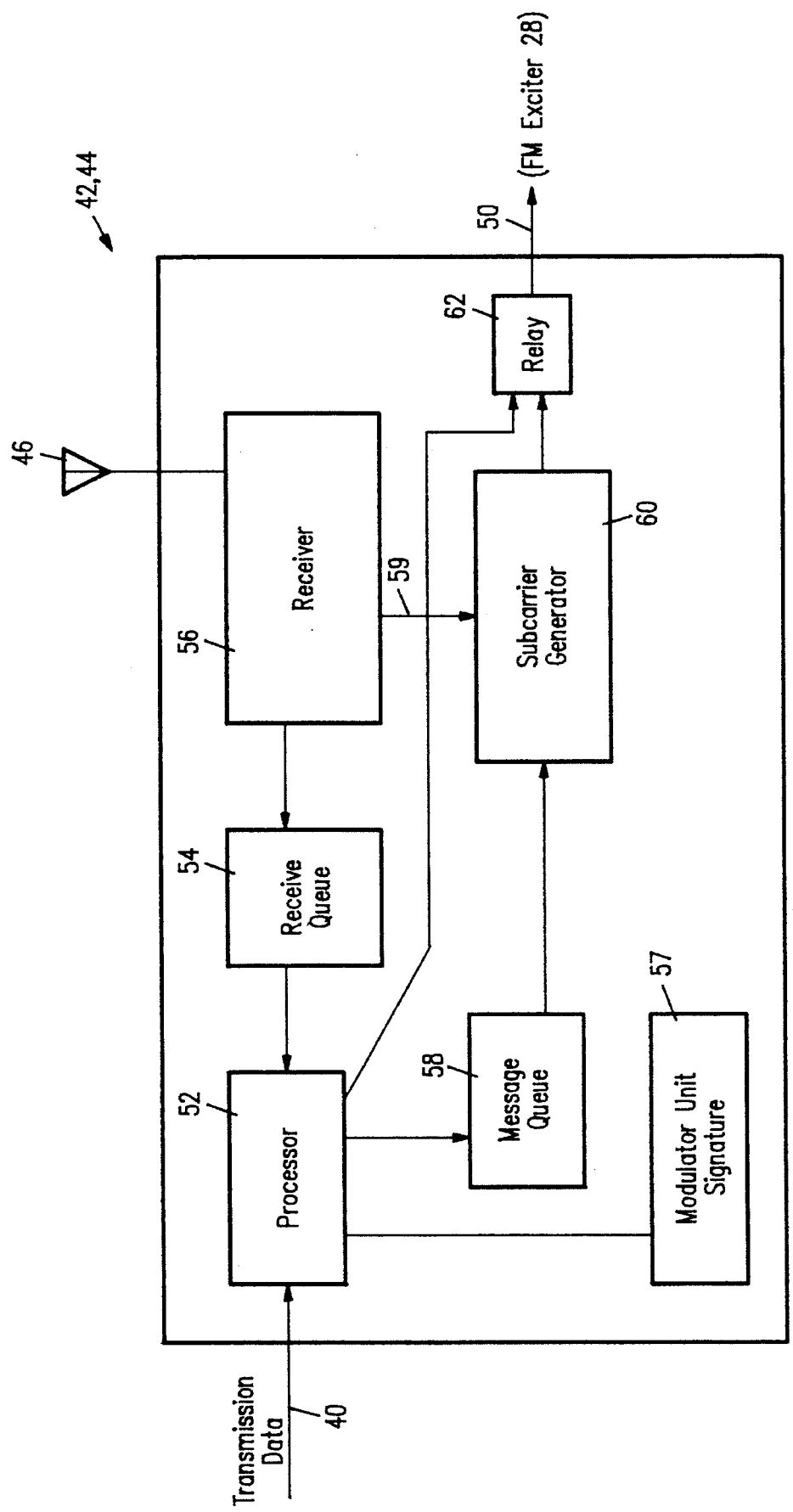
FIG. 3 is a detailed diagram of a modulator unit for the system shown in FIG. 2.

To explain further, FIG. 3 is a detailed circuit diagram for each of the modulator units 42 and 44 previously shown in FIG. 2. A processor 52 receives the transmission data from LAN line 40 and generates digitally encoded data into a time division multiplexed data frame format as described below. The digital data is stored in message queue 58. A modulator unit identification signature is stored in a register 57 and embedded into the data frames stored in message queue 58. The data in the message queue 58 is then combined with a subcarrier signal in subcarrier generator 60. The relay 62 selectively couples and decouples the output from subcarrier generator 60 to FM exciter 28 (FIG. 2).

Antenna 46 is coupled to a receiver 56 that monitors the transmission signal 34 output from antenna 32 (FIG. 2). The data from transmission signal 34 is stored in receiver queue 54. The processor 52 reads the data in receiver queue 54 to determine whether to enable or disable relay 62 as will be described below. The receiver 56 also feeds back timing and phase data to subcarrier generator 60 over line 59 to adjust the timing for the subcarrier signal.

Figure 4:
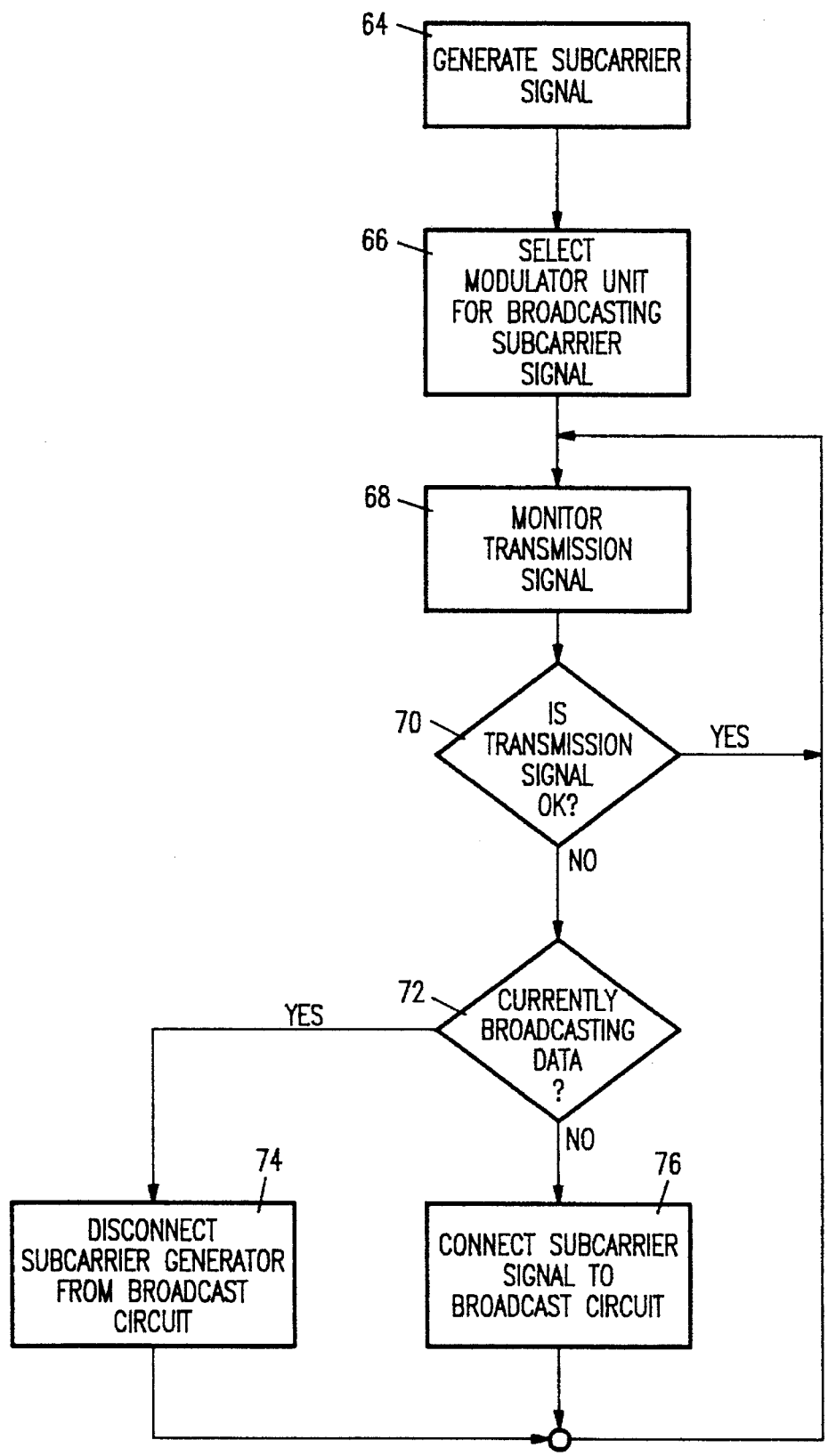
FIG. 4 is a step diagram showing communication protocol for the redundant modulator units shown in FIG. 2.

FIG. 4 is a step diagram showing the redundancy status protocol performed by each modulator unit 42 and 44. The same transmission data from LAN 40 (FIG. 2) is independently received, encoded and combined with the same subcarrier frequency by both modulator units at the same time in Step 64. Step 66 then determines which modulator unit is initially coupled by relay 62 (FIG. 3) to the transmission circuit 49 (FIG. 2).

There are several priority protocols that can be used for determining which modulator unit will be broadcasting data through transmission circuit 49. For example, one modulator unit may be programmed to automatically start transmitting data. The processor 52 then directs relay 62 to connect the output of subcarrier generator 60 to transmission circuit 49 (FIG. 2). Alternatively, both modulator units may first check for transmission data received by receiver 56. If the receiver queue contains data transmitted from another modulator unit, then relay 62 does not couple the output of subcarrier generator 60 to the transmission circuit 49.

If no transmission signal is received by receiver 56, processor 52 determines that no modulator unit is currently transmitting data. Accordingly, the output of subcarrier generator 60 is coupled to transmission circuit 49. A random time generator is used to prevent both modulator units 42 and 44 from connecting and disconnecting to transmission circuit 49 at the same time.

After data transmission begins, both receivers in step 68 continues to monitor the transmission signal 34 output from antenna 32. The processor 52 in each modulator unit decodes the transmission data to determine which modulator unit is currently coupled to the transmission circuit 49. Each modulator unit also tests the data carried on the transmission signal. For example, standard test routines are performed by the processor 52 to determine whether the transmission signal 34 is transmitted at the right time and with the correct data. Transmission test software is well known to those skilled in the art and, therefore, is not described in detail.

If the frame data is being transmitted correctly, decision step 70 returns to step 68 to continue transmission signal monitoring. If erroneous frame data is detected by processor 52, decision block 72 determines which modulator unit output the transmission signal by reading the modulator unit signature embedded in the frame data.

If a first modulator unit is the source of the bad frame data, step 74 disconnects the subcarrier generator 60 of the first modulator unit from the transmission circuit 49 via relay 62. The second modulator unit is also monitoring the transmission signal 34 at the same time. The second modulator unit determines that the erroneous frame data is being transmitted from the first modulator unit. Accordingly, the relay 62 in the second modulator unit connects the output of subcarrier generator 60 to transmission circuit 49.

When not coupled to transmission circuit 49, each modulator unit operates in a "hot standby" mode where it continues to both combine digitally encoded data with the subcarrier signal and monitor the transmission signal 34. Thus, each modulator unit can immediately begin backup signal transmission if the primary modulator unit fails.

Figure 5:
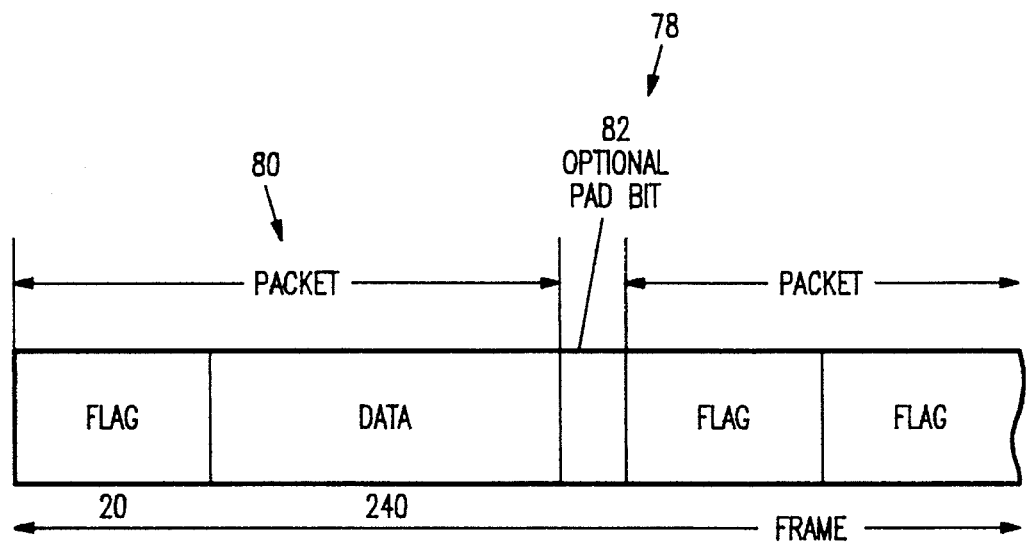
FIG. 5 is a diagram showing a prior art data format for carrying pager messages.

FIG. 5 is a schematic showing a prior art format used for transmitting data in wireless pager receivers. Multiple packets 80 contain time division multiplexed data digitally encoded into a continuous data stream. Each packet 80 includes 240 bits of message data and a 20 bit flag field. Multiple packets are combined together forming a data frame 78. Each data frame contains multiple messages directed to different receivers. Pad bits 82 are selectively stuffed between adjacent packets 80 to correct for clock drift in the modulator unit data clock. Generating data frames is discussed in detail in Gaskill et al. and is herein incorporated by reference.

Figure 6:
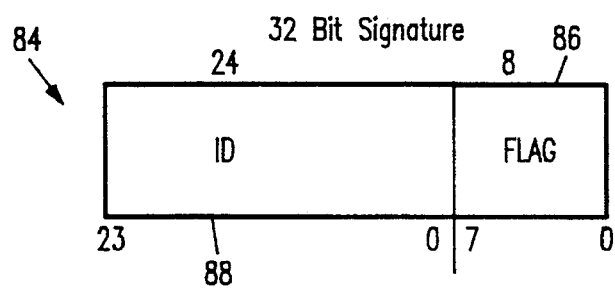
FIG. 6 is a diagram showing a modulator unit identification signature format.

FIG. 6 is a format for the modulator unit identification signature 84 embedded in the pad bits 82 shown in FIG. 5. The signature comprises 32 bits including eight flag bits 86 for marking the beginning of the signature. The signature 84 further includes twenty-four identification (ID) bits that identify which modulator unit is currently transmitting the data frames. The signature 84 is repeatedly transmitted each data frame in the same sequence shown in FIG. 6. Thus, both modulator units can identify the transmission source anytime a transmission failure occurs.

Figure 7:
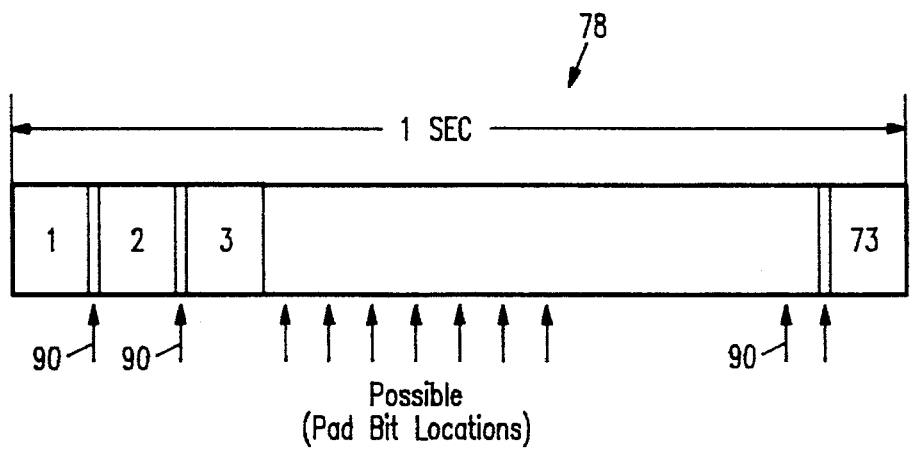
FIG. 7 is a diagram showing locations in a data frame where portions of the signature shown in FIG. 6 are embedded between data packets.

FIG. 7 is a schematic showing a one-second period of transmission time for the data frame transmitted from antenna 32 (FIG. 2). Data packets (1–73) are transmitted at a rate of 73 packets per second. Pad bits 90 are stuffed between selected packets 1–73 as shown in FIG. 6. Thus, seventy-three different pad bit locations are potentially available each second for storing portions of the modulator unit signature.

Normally, only approximately 11 pad bits are stuffed between packets during a second period. Thus, eleven pad bits are typically available each second for transmitting portions of the modulator unit signature shown in FIG. 6. For example, the pad bit between packets 1 and 2 would contain the first bit of flag 86 (FIG. 6). The pad bit between packets 2 and 3 would carry the second bit of flag 86, etc. The exact rate at which pad bits are generated and where the pad bits are located between packets varies according to changes in the transmitter clock and other hardware variables.

The format of the modulator unit signature 84 shown in FIG. 6 can vary depending on the current modulator unit configuration. For example, if only two modulator units exist in each transmission system, fewer bits are required in ID 88 to identify the two different modulator units. Thus, a smaller word size can be used to identify each modulator unit allowing the signature 84 to be transmitted more frequently.

Since the pad bits are already generated in data frames, such as discussed in Gaskill et al., redundancy control data (modulator unit signature) can be transmitted without changing current data formats and transmission protocols.

Each modulator unit in the invention independently reads transmission signals to communicate redundancy status. Thus, dedicated hardware typically required for relaying redundancy status is eliminated, reducing hardware complexity.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed:

1. A system for switching between redundant hardware in a wireless communication system, comprising:

a first modulator unit including a first signal generator outputting a first signal containing data and a first processor coupled to the first signal generator for enabling and disabling transmission of the first signal;

a second redundant modulator unit including a second signal generator for outputting a second signal containing the same data and a second processor coupled to the second signal generator for enabling and disabling transmission of the second signal;

a first receiver coupled to the first processor that independently initiates transmission of the first signal according to the transmission from one of said first and second signals; and a second receiver coupled to the second processor that independently initiates transmission of the second signal according to the transmission from one of said first and second signals.

2. A system according to claim 1 including a local area network coupled to both the first and second modulator unit.

3. A system according to claim 1 wherein the first and second modulator unit each include a receiving queue coupled to the first and second receiver, respectively, for storing data from the transmitted first and second signal.

4. A system according to claim 3 wherein the first and second modulator unit each include a message queue coupled to the first and second processor, respectively, the message queue storing both encoded transmission data and a signature identifying the modulator unit.

5. A system according to claim 1 including a transmission circuit coupled to both the first and second modulator unit for selectively broadcasting one of said first and second signal to a remote wireless receiver.

6. A system according to claim 5 including a first relay coupled between the first modulator unit and the transmission circuit and a second relay coupled between the second modulator unit and the transmission circuit.

7. A system according to claim 1 wherein the first and second signal generator each comprise a subcarrier generator that combine transmission data with a subcarrier signal, the transmission data and subcarrier signal for the first and second signal generator being the same.

8. A system according to claim 1 wherein each modulator unit includes the following:

means for encoding the data into multiple packets further combined together to form data frames;

means for generating a unique modulator unit identification signature; and means for embedding the identification signature into each data frame.

9. A method for switching between a first modulator unit and a second redundant modulator unit in a wireless broadcast system, comprising:

generating a first signal from the first modulator unit, the first signal containing data;

generating a second signal from the second redundant modulator unit, the second signal containing the same data;

broadcasting one of said first signal and said second signal over a wireless communication medium to a remote receiver;

independently monitoring the broadcast signal with both the first and second modulator units; and selectively switching signal broadcasting between the first modulator unit and the second modulator unit according to the monitored broadcast signal.

10. A method according to claim 9 including embedding a signature into the first signal identifying the source of the first signal as the first modulator unit and into the second signal identifying the same of the second signal as the second modulator unit.

11. A method according to claim 10 including independently decoding the signature contained in the broadcast signal by both the first and second modulator unit.

12. A method according to claim 11 including the following steps:

monitoring for errors in the data contained in the broadcast signal;

discontinuing broadcasting from the modulator unit generating said broadcast signal; and initiating broadcasting from the modulator unit not broadcasting the erroneous data.

13. A method according to claim 9 including the following steps:

generating the data in a time division multiplexed data stream having multiple packets combined to form data frames, the packets positioned at different temporal locations in said data stream; and separating the packets at selected locations in the data frame with pad bits.

14. A method according to claim 13 including embedding a modulator unit identification signature in the pad bits.

15. A method according to claim 9 including the following:

generating the first and second signal at the same time;

independently monitoring the broadcast signal with the first and second modulator unit at the same time; and selecting broadcast from one of said first and second modulator unit while the unselected modulator unit remains in a hot-standby mode.

16. A method according to claim 9 wherein the step of monitoring the broadcast signal comprises:

receiving a wireless signal transmission in both the first and second modulator unit;

storing data from the received signal transmission in both the first and second modulator unit;

processing the stored data to determine a modulator unit signature identifying the source of the signal transmission; and coupling and decoupling the first and second modulator unit to a transmission circuit according to the data and the modulator unit signature.

17. A method according to claim 9 including the following steps:

receiving data by the first and second modulator unit at the same time;

combining the data in both the first and second modulator unit with a unique modulator unit signature; and combining the data and associated modulator signature with a common subcarrier frequency in both the first and second modulator.

18. A system for switching between redundant hardware in a wireless broadcast system, comprising:

multiple modulator units each including the following:

a processor for combining data with an associated modulator unit signature;

a subcarrier generator coupled to the processor for outputting a subcarrier signal containing both the data and modulator unit signature;

a receiver coupled to both the processor and the subcarrier generator for monitoring broadcasts from one of said modulator units; and a relay coupled to the subcarrier generator for selectively enabling transmission of the subcarrier signal according to the monitored broadcast.

19. The system according to claim 18 including the following:

an FM exciter including a first input coupled to all modulator units and a second input for receiving an FM audio signal;

a power amplifier coupled to the FM exciter; and a broadcast antenna coupled to the power amplifier.

\* \* \* \* \*